United States Patent [19]

Ernst

[11] Patent Number: 4,602,436
[45] Date of Patent: Jul. 29, 1986

[54] POSITION MEASURING SYSTEM

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 713,458

[22] Filed: Mar. 19, 1985

[30] Foreign Application Priority Data

Mar. 31, 1984 [DE] Fed. Rep. of Germany ....... 3412128

[51] Int. Cl.⁴ ............................................ G01B 11/04
[52] U.S. Cl. ............................... 33/125 C; 250/237 G
[58] Field of Search ............. 33/125 R, 125 A, 125 C; 250/237 G

[56] References Cited

U.S. PATENT DOCUMENTS

| 3,578,979 | 5/1971 | Kawaguchi et al. | 250/237 G |
| 3,713,139 | 1/1973 | Sanford et al. | 250/237 G |
| 4,078,173 | 3/1978 | Fultz | 250/237 G |
| 4,225,931 | 9/1980 | Schwefel | 364/577 |
| 4,477,189 | 10/1984 | Ernst | 33/125 C |
| 4,519,709 | 5/1985 | Nelle | 33/125 C |

FOREIGN PATENT DOCUMENTS

| 2207132 | 8/1973 | Fed. Rep. of Germany ... 250/237 G |
| 1941731 | 11/1973 | Fed. Rep. of Germany . |
| 2729697 | 7/1977 | Fed. Rep. of Germany . |
| 169613 | 10/1982 | Japan .............................. 250/237 G |

Primary Examiner—Richard R. Stearns
Attorney, Agent, or Firm—Willian, Brinks, Olds, Hofer, Gilson & Lione Ltd.

[57] ABSTRACT

In a position measuring system for measuring the relative position of two objects, a scale having a graduation with a graduation period P is scanned by a scanning unit in order to generate a periodic analog signal having a bandwidth N. In order to generate harmonic-free Fourier coefficients of the fundamental wave of the periodic analog signal, a scanning plate included in the scanning unit includes a first scanning group with first and second scanning fields as well as a second scanning group with first and second scanning fields. The first scanning group is offset with respect to the second scanning group by P/4. The first scanning fields are offset with respect to the second scanning fields by P/2. Each scanning field includes N partial fields which are offset with respect to one another by P/2N in the measuring direction. The widths of the partial fields are varied in the measuring direction according to a sine function. To each scanning field there is allocated a scanning element, and the scanning elements of the second scanning fields are connected in difference of those of the first scanning fields. The scanning elements are connected to an evaluating arrangement for the formation of position measuring values.

12 Claims, 9 Drawing Figures

POSITION MEASURING SYSTEM

BACKGROUND OF THE INVENTION

The present invention relates to a position measuring system for measuring the relative position of two objects, which includes a graduation scanned by a scanning unit to generate at least one periodic analog signal.

In photoelectric measuring systems for measuring the relative position of two objects (such as the relative position between a slidepiece and a bed of a machine tool) a graduation carrier is provided which includes a graduation and is connected with one of the two objects. A scanning unit is connected to the other of the two objects to scan the graduation. The scanning unit includes an illuminating arrangement and a scanning plate which can for example define two scanning fields, the graduations of which are offset with respect to one another by a quarter of the graduation period of the graduation and which agree precisely with the graduation of the graduation carrier. In addition, separate photosensitive elements are allocated to each of the scanning fields. In measuring systems built according to the transmitted light principle, the similar graduations of the scanning plate and the graduation carrier are made up of alternating photopermeable and photoimpermeable strips having a longitudinal extent oriented transversely to the measuring direction. The strips follow one another in alternation in the measuring direction (the longitudinal extent to the graduation carrier). The light flux generated by the illuminating arrangement which passes through the graduations of the graduation carrier and the scanning plate falls upon the respective photosensitive elements and is modulated by the graduations during relative movement between the two objects. The two photosensitive elements aligned with respective ones of the scanning fields generate respective periodic analog signals which are phase-shifted by 90° with respect to one another. These analog signals are applied as inputs to an evaluating arrangement which generates position measuring values therefrom. The phase displacement between the two analog signals permits the direction of measurement to be determined and also allows interpolation of the graduation.

The period of the analog signals generated by the photosensitive elements is determined by the graduation period or grid constant of the graduation of the graduation carrier. The graduation period is determined by the widths of the photopermeable and the photoimpermeable strips in the measuring direction. During relative movement between the scanning unit and the graduation of the graduation carrier, each scanned graduation period is detected by a counting pulse and displayed as a position measuring value.

In general, the periodic analog signals generated from the graduation of the graduation carrier during scanning are not purely sinusoidal in wave form. Rather, these periodic analog signals are typically affected with harmonics as a consequence of (1) spacing fluctuations between the graduation surfaces of the scanning plate and the graduation carrier, or (2) imprecisions in the graduations themselves caused for example by differing spacings of the photopermeable and photoimpermeable strips, or by an edge vagueness of the strips. In order to preserve the analog signals substantially free of harmonics, relatively high demands must be placed on the maintenance of an optimal spacing between the graduation surfaces of the scanning plate and the graduation carrier during the scanning operation. Furthermore, if exact position measuring values are to be formed for each graduation period and exact subdivision of the graduation period is to be accomplished by interpolation for further measuring accuracy, the analog signals obtained from the graduation must be free of harmonics. The formation of interpolation values, for example by means of a computer, is described in DE-OS No. 27 29 297.

Measuring systems utilizing relatively large grid constants (for example 0.1 mm) often generate triangular or trapezoidal analog signals, which by their nature are always affected by harmonics.

German Patent DE-PS No. 19 41 731 discloses a photoelectric length measuring system in which a frequency filter diaphragm with a sinusoidal permeability course is provided to allow recovery of a harmonic-free analog signal during the scanning of the graduation of a graduation carrier. This measuring system presents the disadvantage that a special frequency filter diaphragm must be produced and installed. Furthermore, the field of this frequency filter diaphragm must be completely transilluminated and scanned, which is not always feasible as a practical matter, particularly when scanning in the reflection measuring process. Moreover, the sinusoidal contour of the frequency filter diaphragm causes a considerable reduction in light flux.

SUMMARY OF THE INVENTION

The present invention is directed to an improved measuring system in which harmonic-free periodic signals are recovered, which does not require special optical elements for this purpose, and which can be used both in direct light and in reflected light measuring systems.

According to this invention, a position measuring system of the type described initially above is provided with at least two first scanning fields included in the scanning unit, offset with respect to one another along the measuring direction. Each scanning field comprises N partial fields, where N is the bandwidth of the periodic analog signal. Adjacent partial fields are displaced with respect to one another by a constant dimension in the measuring direction, and each of the partial fields defines a respective width along the measuring direction. The widths of the partial fields vary according to a sine function. In addition, means are provided for developing first periodic signals from the partial fields and for superposing the first periodic signals to generate a harmonic-free periodic analog signal. In an alternate embodiment of this invention, the scanning fields each define respective scanning field midlines and the scanning field midlines are offset with respect to one another along the measuring direction. Each scanning field in this embodiment comprises M partial fields where M is greater than or equal to N. These partial fields are positioned such that the separation in the measuring direction between the partial field midlines and the scanning field midlines varies according to an arc sin function, and each of the partial fields defines a constant width.

The present invention provides the important advantage that harmonic-free periodic signals are recovered in a remarkably simple manner utilizing only conventional optical components of known position measuring systems, without requiring additional elements such as frequency filter diaphragms. Furthermore, the present invention can be used to reduce the demands on the accuracy of the graduation as well as on the accuracy with which a constant spacing between the graduation surfaces of the scanning plate and of the graduation carrier must be maintained. In this way, an economical, conventionally constructed measuring apparatus is provided and the need to keep multiple types of measuring instruments in stock is reduced. Further advantageous features are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
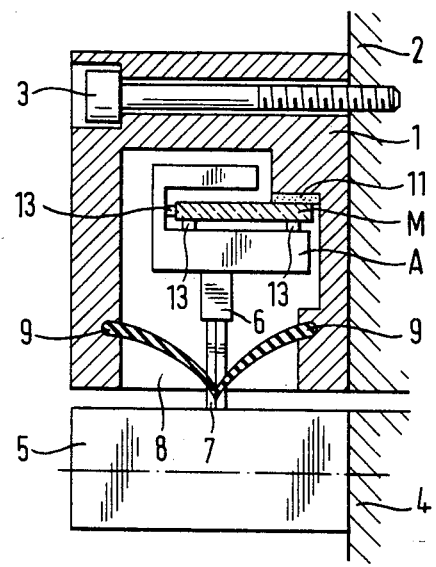
FIG. 1 is a cross-sectional view of a length measuring instrument which incorporates a first preferred embodiment of this invention.

Turning now to the drawings, FIG. 1 shows a photoelectric length measuring system in cross-section. This measuring system includes a housing 1 which takes the form of a hollow profile and is fastened to a bed 2 of a machine tool (not shown) by means of a threaded fastener 3. The machine tool includes a slidepiece 4, and a mounting foot 5 is fastened to the slidepiece 4 in any suitable manner. A follower 6 which defines a sword-shaped tapered section 7 is mounted to the mounting foot 5 to extend into the housing 1 through a slit 8 formed in the otherwise completely enclosed housing 1. A pair of elastic sealing lips 9 are mounted to the housing 1 to close the slit 8 around the follower 6, thereby sealing off the interior of the housing 1. A measuring scale M is mounted to an inner surface of the housing 1 by means of an elastic adhesive layer 11. A scanning unit A is coupled to the slidepiece 4 by means of the follower 6 and a coupling (not shown) which compensates for alignment deviations between the slidepiece 4 and the scale M. The scanning unit A is guided on the scale M by rollers 13.

Figure 2:
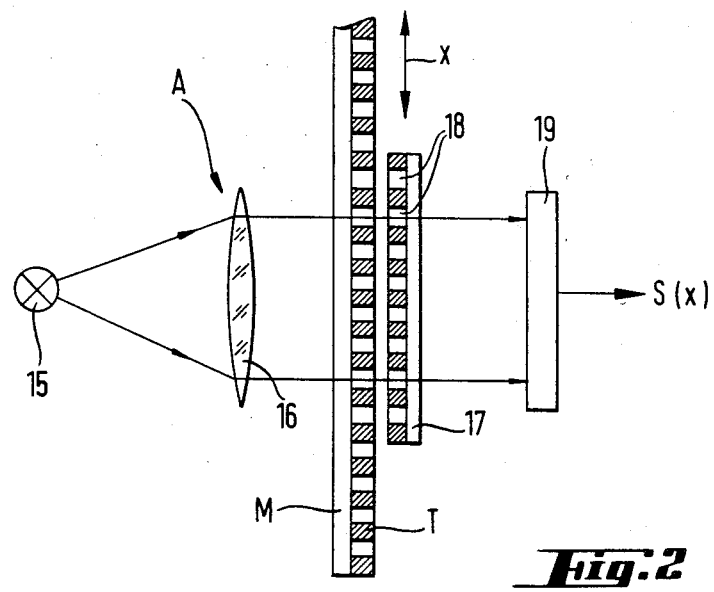
FIG. 2 is a schematic representation of a scanning unit included in the embodiment of FIG. 1.

As shown in FIG. 2, the scanning unit A includes a number of components used in scanning the graduation T of the scale M. These components include a light source 15, a condenser lens 16, a scanning plate 17 which defines a graduation 18, and a photosensitive element 19. The graduation 18 of the scanning plate 17 is identical to the graduation T of the scale M. Light flux generated by the light source 15 is collimated by the condenser 16 and passes through the graduation T, 18 of the scale M and the scanning plate 17 and falls upon the photosensitive element 19. When the scanning unit A with the scanning plate 17 moves in the measuring direction x with respect to the fixed scale M, light flux on the photosensitive element 19 is modulated by the graduations T, 18 such that the photosensitive element 19 generates a periodic electrical analog signal $S(x)$ which can be evaulated, counted, and brought to display in digital form as a position measuring value.

The periodic analog signal $S(x)$ generated by the photo-element 19 is in general affected with harmonics and can be represented as a function of the measuring path x by a Fourier series:

$$S(x) = a_o + \sum_{k=1}^{N} (a_k \cos kx + b_k \sin kx).$$

In this equation, the running summation index k is the ordinal number of the waves or frequencies (fundamental wave: k=1, 1st harmonic: k=2 etc.) and $a_k$, $b_k$ are the Fourier coefficients.

To recover harmonic-free periodic analog signals $a_1$, $b_1$ there is determined first of all the maximum bandwidth N (number of frequencies or waves with nonvanishing Fourier coefficients $a_k$, $b_k$) of the periodic analog signal $S(x)$ typical of the graduation T of the scale M. In order to make this determination of the bandwidth N, the graduation T is scanned, for example, by means of the graduation 18 of the scanning plate 17 and the photosensitive element 19 according to FIG. 2, with reference to a reference measuring system (not shown) over the entire measuring length. The periodic analog signal $S(x)$ obtained is subjected to a computational Fourier analysis. The bandwidth N must be determined only once, in the case of a series of graduations identical with the graduation T. This determination of the bandwidth N can be carried out by the worker in the field also by estimate on the basis of his experience.

In order to filter out from the periodic analog signal $S(x)$ obtained with the bandwidth N $$S(x) = a_o + \sum_{k=1}^{N} (a_k \cos kx + b_k \sin kx)$$

the fundamental wave with the Fourier coefficients $a_1$, $b_1$ $$a_1 = (1/N) \sum_{n=1}^{2N} S_n(x + n\pi/N) \cdot \cos(n\pi/N)$$

$$b_1 = (1/N) \sum_{n=1}^{2N} S_n(x + n\pi/N) \cdot \sin(n\pi/N)$$

there can be generated a first group of 2N signals $S_n(x)$ that present a mutual phase displacement $\Delta\alpha = 2\pi/2N = \pi/N$, multiplied with a factor $\cos(n\pi/N)$ and summed up; there is obtained from the $\bar{a}_1(x)$:

$$\bar{a}_1(x) = \sum_{n=1}^{2N} S_n(x + n\pi/N) \cos(n\pi/N).$$

Similarly there can be generated a second group of 2N signals $S_n(x)$ that present a mutual phase displacement of $\Delta\alpha = \pi/N$ multiplied with a factor $\sin(n\pi/N)$ and summed up; there is obtained then the signal $\bar{b}_1(x)$:

$$\overline{b}_1(x) = \sum_{n=1}^{2N} S_n(x + n\pi/N) \sin(n\pi/N).$$

These signals $\overline{a}_1(x)$ and $\overline{b}_1(x)$ correspond to the Fourier coefficients $a_1(x)$ and $b_1(x)$ except for a proportionality factor $1/N$:

$$a_1(x) = (1/N)\overline{a}_1(x)$$

$$b_1(x) = (1/N)\overline{b}_1(x).$$

According to one embodiment of the invention, for the determination of the first Fourier coefficient $a_1$ of the fundamental wave of the periodic analog signal $S(x)$ with the bandwidth N the first group of 2N signals $S_n(x)$ phase-displaced to one another in each case by the phase angle $\Delta\alpha = \pi/N$ is generated by means of a first scanning group $G_a$ of 2N partial fields $F_{a1n}$, $F_{a2n}$ (n=1, 2, ..., N) correspondingly offset to one another, and by means of two photo-elements $P_{a1}$, $P_{a2}$, switched in difference, which are allocated to the partial fields $F_{a1n}$, $F_{a2n}$. The multiplication of the signals $S_n(x)$ with the factor $\cos(n\pi/N)$ occurs through the proper dimensioning of the width of the individual partial fields $F_{a1n}$, $F_{a2n}$ in the measuring direction x and the summation of the signals $S_n(x)$ provided with the factor $\cos(n\pi/N)$ is accomplished by the photo-elements $P_{a1}$, $P_{a2}$.

For the determination of the second Fourier coefficient $b_1$ of the fundamental wave of the periodic analog signal $S(x)$ with the bandwidth N, the second group of 2N signals $S_n(x)$ phase-displaced to one another in each case by the phase angle $\Delta\alpha = \pi/N$ is generated by means of a second scanning group $G_b$ of 2N partial fields $F_{b1n}$, $F_{b2n}$ (n=1, 2, ..., N) correspondingly offset with respect to one another and by means of two photo-elements $P_{b1}$, $P_{b2}$ switched in difference, which are allocated to the partial fields $F_{b1n}$, $F_{b2n}$. The multiplication of the signals $S_n(x)$ with the factor $\sin(n\pi/N)$ occurs through the proper dimensioning of the width of the individual partial fields $F_{b1n}$, $F_{b2n}$ in the measuring direction x and the summation of the signals $S_n(x)$ provided with the factor $\sin(n\pi/N)$ is accomplished by the two photo-elements $P_{b1}$, $P_{b2}$.

The first scanning group $G_a$ includes a first scanning field $G_{a1}$ with N partial fields $F_{a1n}$ (n=1, 2, ..., N) and a second scanning field $G_{a2}$ with N partial fields $F_{a2n}$; The second scanning group $G_b$ similarly includes a first scanning field $G_{b1}$ with N partial fields $F_{b1n}$ and a second scanning field $G_{b2}$ with N partial fields $F_{b2n}$.

The first scanning group $G_a$ is displaced with respect to the second scanning group $G_b$ by a quarter of the graduation period P of the graduation T of the scale M in the measuring direction x, while in each case the first scanning fields $G_{a1}$, $G_{b1}$ are offset against the second scanning fields $G_{a2}$, $G_{b2}$ of the two scanning groups $G_a$, $G_b$ by half the graduation period P of the graduation T in measuring direction x. In each case between adjacent partial fields $F_{a1n}$, $F_{a2n}$, $F_{b1n}$, $F_{b2n}$ there is present a constant displacement of $P/2N$ in measuring direction x. The widths $B_{a1n}$, $B_{a2n}$ in measuring direction of the partial fields $F_{a1n}$, $F_{a2n}$ of the first scanning group $G_a$ are proportional to a factor $|\cos(n\pi/N)|$ and the widths $B_{b1n}$, $B_{b2n}$ in the measuring direction x of the partial fields $F_{b1n}$, $F_{b2n}$ of the second group $G_b$ are proportional to a factor $|\sin(n\pi/N)|$.

To each scanning field $G_{a1}$, $G_{a2}$, $G_{b1}$, $G_{b2}$ there is allocated a respective scanning element in the form of a photosensitive element $P_{a1}$, $P_{a2}$, $P_{b1}$, $P_{b2}$. The scanning elements $P_{a2}$, $P_{b2}$ of the second scanning fields $G_{a2}$, $G_{b2}$ are connected in each case in difference to the scanning elements $P_{a1}$, $P_{b1}$ of the first scanning fields $G_{a1}$, $G_{b1}$. The scanning elements $P_{a1}$, $P_{aa2}$, $P_{b1}$, $P_{b2}$ connected in difference are connected in each case with an evaluating arrangement W for the formation of position measuring values.

The cosine of the phase angle is half positive and half negative over a graduation period P of the graduation T of the scale M, but the widths $B_{a1n}$, $B_{a2n}$ of the partial fields $F_{a1n}$, $F_{a2n}$ of the first scanning group $G_a$ can be only positive. For this reason, to the first scanning field $G_{a1}$ of the first scanning group $G_a$ with the N partial fields $F_{a1n}$ (which lie in the range between the phase angle $\alpha = -\pi/2$ and $\alpha = +\pi/2$) there is allocated the first photo-element $P_{a1}$ and to the second scanning field $G_{a2}$ of the first scanning group $G_a$ with the N partial fields $F_{a2n}$ (which lie in the range between the phase angle $\alpha = \pi/2$ and $\alpha = 3\pi/2$) there is allocated the second photo-element $P_{a2}$, which is connected antiparallel (in difference) to the first photo-element $P_{a1}$ for the sum formation. Similarly, the sine of the phase angle $\alpha$ over a graduation period P of the graduation T is likewise half positive and half negative. Therefore, to the first scanning field $G_{b1}$ of the second scanning group $G_b$ with N partial fields $F_{b1n}$ (that lie in the range between the phase angles $\alpha = 0$ and $\alpha = \pi$) there is allocated the first photo-element $P_{b1}$ and to the second scanning field $G_{b2}$ of the second scanning group $G_b$ with N partial fields $F_{b2n}$ (that lie in the range between the phase angles $\alpha = \pi$ and $\alpha = 2\pi$) there is allocated the second photo-element $P_{b2}$, which is connected likewise antiparallel (in difference) to the first photo-element $P_{b1}$ for the sum formation.

Figure 3:
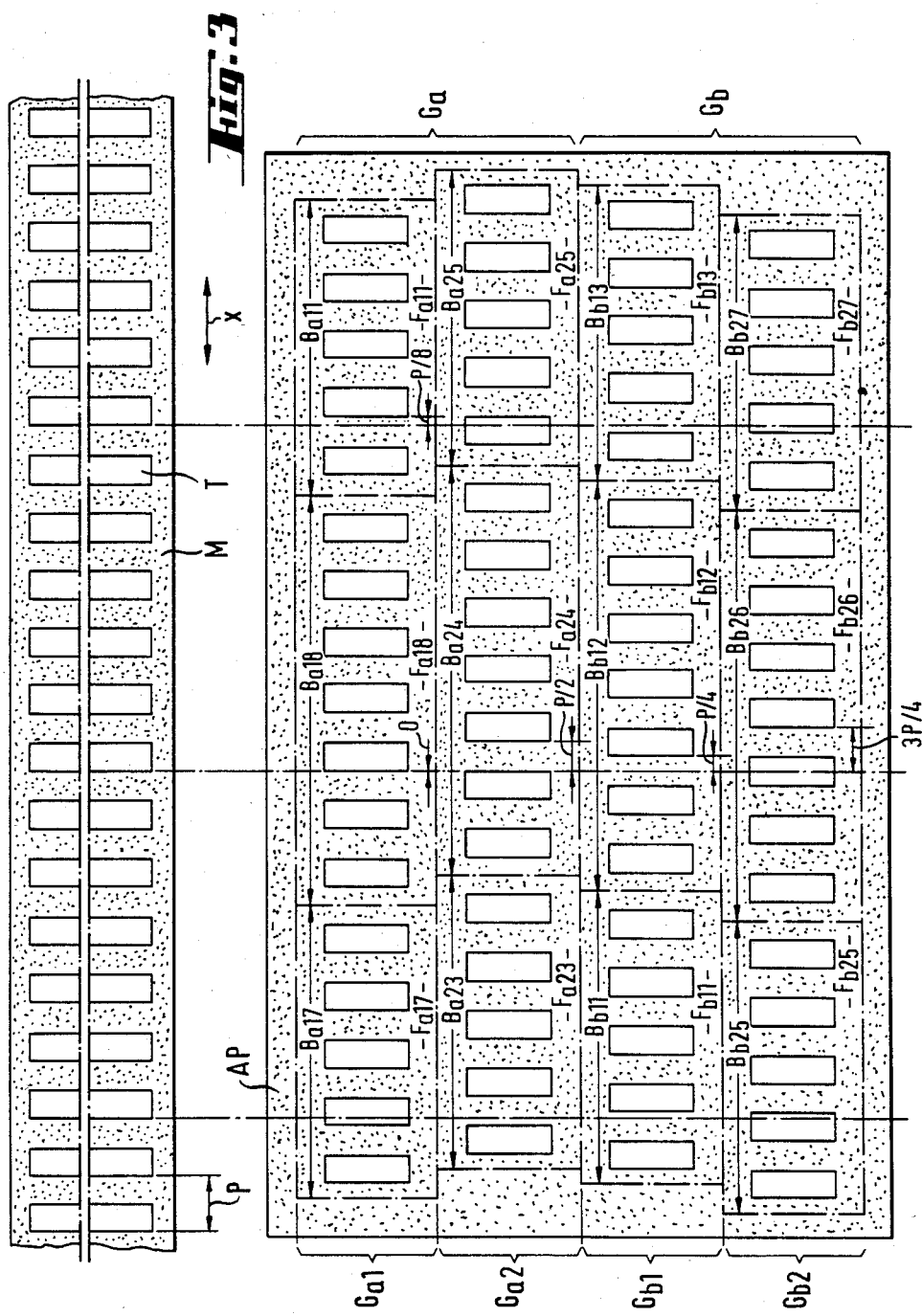
FIG. 3 is a plan view of the graduation of the graduation carrier and the scanning plate of the scanning unit of the embodiment of FIG. 1.

In FIG. 3 the scale M of FIG. 2 is represented in an enlarged view. The scale M defines the graduation T which is scanned with the graduation period P by the scanning unit A by means of the scanning plate AP. The periodic analog signal recovered from the graduation T, let us assume, has the bandwidth N=4. According to this embodiment of the invention, therefore, in order to obtain a first harmonic-free periodic analog signal in the form of the first Fourier coefficient $a_1$ of the fundamental wave of the periodic analog signal $S(x)$, there is arranged a first scanning group $G_a$ with $2N=8$ partial fields $F_{a11}$, $F_{a12}$, $F_{a17}$, $F_{a18}$, $F_{a23}$–$F_{a26}$, and in order to obtain a second harmonic-free periodic analog signal in the form of the second Fourier coefficient $b_1$ of the fundamental wave of the periodic analog signal $S(x)$ there is arranged a second scanning group $G_b$ with 8 partial fields $F_{b1}$–$F_{b14}$, $F_{b25}$–$F_{b28}$ on the scanning plate AP.

In each case between adjacent partial fields $F_{a11}$, $F_{a12}$, $F_{a17}$, $F_{a18}$, $F_{a23}$–$F_{a26}$ of the first scanning group $G_a$ and between adjacent partial fields $F_{b11}$–$F_{b14}$, $F_{b25}$–$F_{b28}$ of the second scanning group $G_b$ there is present a constant displacement of $P/2N = P/8$ in the measuring direction. Between the first scanning field $G_{a1}$ with the partial field $F_{a11}$, $F_{a12}$, $F_{a17}$, $F_{a18}$, and the second scanning field $G_{a2}$ with the partial fields $F_{a23}$–$F_{a26}$ of the first scanning group $G_a$ as well as between the first scanning field $G_{b1}$ with the partial fields $F_{b11}$–$F_{b14}$ and the second scanning field $G_{b2}$ with partial fields $F_{b25}$–$F_{b28}$ of the second scanning group $G_b$ there is present in each case a displacement of $P/2$ in the measuring direction; the second scanning group $G_b$ is offset against the first scanning group $G_a$ by P/4 in the measuring direction.

The widths of $B_{a1n}$, $B_{a2n}$ of the individual partial fields $F_{a1n}$, $F_{a2n}$ of the first scanning group $G_a$ in the measuring direction are proportional to the magnitude of the factor $\cos(n\pi/N)$ of the first Fourier coefficient $a_1$, and the widths $B_{b1n}$, $B_{b2n}$ of the individual partial fields $F_{b1n}$, $F_{b2n}$ of the second scanning group $G_b$ are proportional to the magnitude of the factor $\sin(n\pi/N)$ of the second Fourier coefficient $b_1$. The partial fields $F_{a1n}$, $F_{a2n}$, $F_{b1n}$, $F_{b2n}$, may present a basic width of 7P as proportionality factor. Thus there is yielded:

$$B_{a1n} = B_{a2n} = 7P|\cos(n\pi/4)|$$

$$B_{b1n} = B_{b2n} = 7P|\sin(n\pi/4)|.$$

Of the first scanning group $G_a$ the first scanning field $G_{a1}$ with the partial fields $F_{a11}$, $F_{a12}$, $F_{a17}$, $F_{a18}$ serves for the scanning of the positive half period of the cosine wave and the second scanning field $G_{a2}$ with the partial fields $F_{a23}$–$F_{a26}$ serves for the scanning of the negative half period of the cosine wave of the periodic analog signal S(x). For the scanning of the positive half period of the graduation period P of the graduation T the partial fields $F_{a14}$, $F_{a12}$, $F_{a17}$, $F_{a18}$ are allocated to the phase angle $\alpha$ and to the summation index n of the Fourier coefficient $a_1$ as follows, there being yielded the appertaining widths $B_{a1n}$ of the partial fields $F_{a11}$, $F_{a12}$, $F_{a17}$, $F_{a18}$:

| $F_{a1n}$ | $\alpha$ | n | $\cos(n\pi/4)$ | $B_{a1n} = 7P|\cos(n\pi/4)|$ |
|---|---|---|---|---|
| $F_{a17}$ | $7\pi/4$ | 7 | $\cos(7\pi/4) = 0{,}71$ | 5P |
| $F_{a18}$ | 0 | 8 | $\cos 0 = 1$ | 7P |
| $F_{a11}$ | $\pi/4$ | 1 | $\cos(\pi/4) = 0{,}71$ | 5P |
| $F_{a12}$ | $\pi/2$ | 2 | $\cos(\pi/2) = 0$ | 0 |

For the scanning of the negative half period of the graduation period P of the graduation T the scanning fields $F_{a23}$–$F_{a26}$ are allocated to the phase angle $\alpha$ and to the summation index n of the Fourier coefficient $a_1$ as follows, there being yielded the appertaining widths $B_{a2n}$ of the scanning fields $F_{a23}$–$F_{a26}$:

| $F_{a2n}$ | $\alpha$ | n | $\cos(n\pi/4)$ | $B_{a2n} = 7P|\cos(n\pi/4)|$ |
|---|---|---|---|---|
| $F_{a23}$ | $3\pi/4$ | 3 | $\cos(3\pi/4) = -0{,}71$ | 5P |
| $F_{a24}$ | $\pi$ | 4 | $\cos \pi = -1$ | 7P |
| $F_{a25}$ | $5\pi/4$ | 5 | $\cos(5\pi/4) = -0{,}71$ | 5P |
| $F_{a26}$ | $3\pi/2$ | 6 | $\cos(3\pi/2) = 0$ | 0 |

Since the partial fields $F_{a12}$ and $F_{a26}$ have the widths $B_{a12}=0$ and $B_{a26}=0$, they are not represented in FIG. 3.

The graduation T of the scale M is made up of photopermeable strips and photoimpermeable strips of the same width, which follow upon one another in alternation in the measuring direction. The graduation period P of the graduation T is determined by the combined widths of a photopermeable strip and of a photoimpermeable strip in the measuring direction. The partial fields $F_{a1n}$, $F_{a2n}$, $F_{b1n}$, $F_{b2n}$ of the two scanning groups $G_a$, $G_b$ present in each case a graduation that is identical with the graduation T of the scale M. The photoimpermeable strips are represented as dark strips in FIG. 3.

As is evident from the two tables appearing above, the graduation of the partial field $F_{a18}$ presents no displacement with respect to the graduation T of the scale M; the graduations of the partial fields $F_{a11}$, $F_{a12}$, $F_{a17}$, $F_{a18}$, $F_{a23}$,–$F_{a26}$ are uniformly distributed with a mutual displacement of P/8 over the period P of the cosine wave of the periodic analog signal S(x).

Figure 5A:
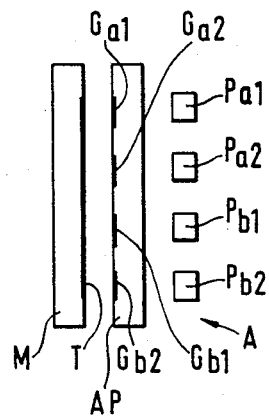
FIGS. 5a and 5b are schematic representations of the scanning unit of the embodiment of FIGS. 1–3.
Figure 5B:
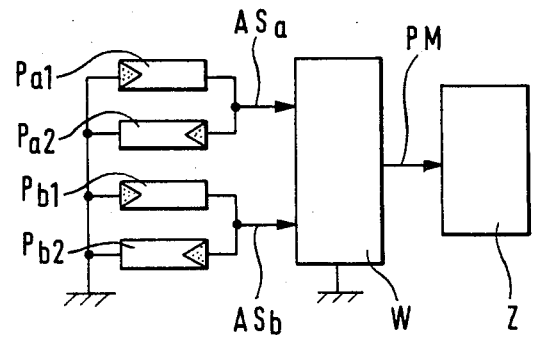

As shown in FIG. 5a, to the first scanning field $G_{a1}$ with the partial fields $F_{a11}$, $F_{a12}$, $F_{a17}$, $F_{a18}$ there is allocated the first photo-element $P_{a1}$ and to the second scanning field $G_{a2}$ with the partial fields $F_{a23}$–$F_{a26}$ there is allocated the second photo-element $P_{a2}$. Since for the partial fields $F_{a23}$–$F_{a26}$ there are yielded negative widths $B_{a2n}$, but only positive widths $B_{a2n}$ are possible, the second photo-element $P_{a2}$ is connected antiparallel (in difference) to the first photo-element $P_{a1}$ (FIG. 5b). The harmonic-free output signal $AS_a$ of the two antiparallel connected photo-elements $P_{a1}$, $P_{a2}$ is proportional to the first Fourier coefficient $a_1$ of the periodic analog signal S(x) and is fed to an evaluating arrangement W for the formation of position measuring values PM, which can be displayed in digital form on a display unit Z engaged on the outlet side.

Of the second scanning group $G_b$, the first scanning field $G_{b1}$ with the partial fields $F_{b11}$–$F_{b14}$ serves for the scanning of the positive half period of the sine wave and the second scanning field $G_{b2}$ with the partial fields $F_{b25}$–$F_{b28}$ serves for the scanning of the negative half period of the sine wave of the periodic analog signal S(x). For the scanning of the positive half period of the graduation period P of the graduation T the partial fields $F_{b11}$–$F_{b14}$ are allocated to the phase angle $\alpha$ and to the summation index n of the Fourier coefficient $b_1$ as follows, there being yielded the appertaining widths $B_{b1n}$ of the partial fields $F_{b11}$–$F_{b14}$:

| $F_{b1n}$ | $\alpha$ | n | $\sin(n\pi/4)$ | $B_{b1n} = 7P|\sin(n\pi/4)|$ |
|---|---|---|---|---|
| $F_{b11}$ | $\pi/4$ | 1 | $\sin(\pi/4) = 0{,}71$ | 5P |
| $F_{b12}$ | $\pi/2$ | 2 | $\sin(\pi/2) = 1$ | 7P |
| $F_{b13}$ | $3\pi n/4$ | 3 | $\sin(3\pi/2) = 0{,}71$ | 5P |
| $F_{b14}$ | $\pi$ | 4 | $\sin \pi = 0$ | 0 |

For the scanning of the negative half period of the graduation period of the graduation T the scanning fields $F_{b25}$–$F_{b28}$ are allocated to the phase angle $\alpha$ and to the summation index n of the Fourier coefficient $b_1$ as follows, there being yielded the appertaining widths $B_{b2n}$ of the scanning fields $F_{b25}$–$F_{b28}$:

| $F_{b2n}$ | $\alpha$ | n | $\sin(n\pi/4)$ | $B_{b2n} = 7P|\sin(n\pi/4)|$ |
|---|---|---|---|---|
| $F_{b25}$ | $5\pi/4$ | 5 | $\sin(5\pi/4) = -0{,}71$ | 5P |
| $F_{b26}$ | $3\pi/2$ | 6 | $\sin(3\pi/2) = -1$ | 7P |
| $F_{b27}$ | $7\pi/4$ | 7 | $\sin(7\pi/4) = -0{,}71$ | 5P |
| $F_{b28}$ | 0 | 8 | $\sin 0 = 0$ | 0 |

Since the scanning fields $F_{b14}$ and $F_{b28}$ have the widths $B_{b14}=0$ and $B_{b28}=0$, they are not represented in FIG. 3.

As is evident from the two tables above, the graduation of the partial field $F_{b28}$ presents no displacement with respect to the graduation T of the scale M; the graduations of the partial fields $F_{b11}$–$F_{b14}$, $F_{b25}$–$F_{b28}$ are offset against one another in each case by the amount P/8. Accordingly, the partial fields $F_{b11}$–$F_{b14}$, $F_{b25}$–$F_{b28}$ are uniformly distributed with a mutual displacement of P/8 over the period P of the sine wave of the periodic analog signal S(x).

As shown in FIG. 5a, to the first scanning field $G_{b1}$ with the partial fields $F_{b11}$–$F_{b14}$ there is allocated the first photo-element $P_{b1}$ and to the second scanning field $G_{b2}$ with the partial fields $F_{b25}$–$F_{b28}$ there is allocated the second photo-element $P_{b2}$. Since for the partial fields $F_{b25}$–$F_{b28}$ there are yielded negative widths $B_{b2n}$, but only positive widths $B_{b2n}$ are possible, the second photo-element $P_{b2}$ is connected antiparallel (in difference) to the first photo-element $P_{b1}$ (FIG. 5b). The harmonic-free output signal $AS_b$ of the two antiparallel connected photo-elements $P_{b1}$, $P_{b2}$ is proportional to the second Fourier coefficient $b_1$ of the periodic analog signal $S(x)$ and is likewise fed to the evaluating arrangement W for the formation of position measuring values PM, which can be displayed in digital form in the display unit Z engaged on the outlet side.

In order to generate the fundamental wave of a recovered periodic analog signal $S(x)$ as nearly as possible completely free of harmonics, the bandwidth N is to be set as high as posssible in an estimate (for example $N=12$). In this case the following relations hold: Width of a partial field $F_n$:

$$B_n;$$

Displacement of a partial field $F_n$ with respect to the middle of a scanning field G with reference to the graduation period $P=2\pi$:

$$\alpha = n\pi/N;$$

Displacement between two successive partial fields $F_n$, $F_{n+1}$:

$$\Delta\alpha = \pi/N;$$

$$B_n = B_o \cos \alpha = B_o \cos(n \cdot \Delta\alpha)$$

$$\sum_{n=-N/2}^{N/2} B_n = B_o \sum_{n=-N/2}^{N/2} \cos(n\,\Delta\alpha) \approx 2B_o N/\pi = C$$

$$B_o = C\pi/2N = C\,\Delta\alpha/2$$

(Where $B_o$ = the base width of the partial field $F_o$ and C = total width of the scanning field G.)
Distance of the middle of partial field $F_n$ from the middle of the scanning field G:

$$r_n = \sum_{n=0}^{N} B_n = B_o \sum_{n=0}^{N} \cos(n\,\Delta\alpha) = (C\pi/2\pi) \sum_{n=0}^{N} \cos(n\,\Delta\alpha)$$

$$= (C\pi/2N) \cdot (N/\pi) \sin(n\,\Delta\alpha)$$

$$= (C/2)\sin(n\,\Delta\alpha)$$

$$r_n = (C/2)\sin\alpha$$
$$\sin\alpha = 2r_n/C$$
$$\alpha = \arcsin(2r_n/C)$$

Figure 7:
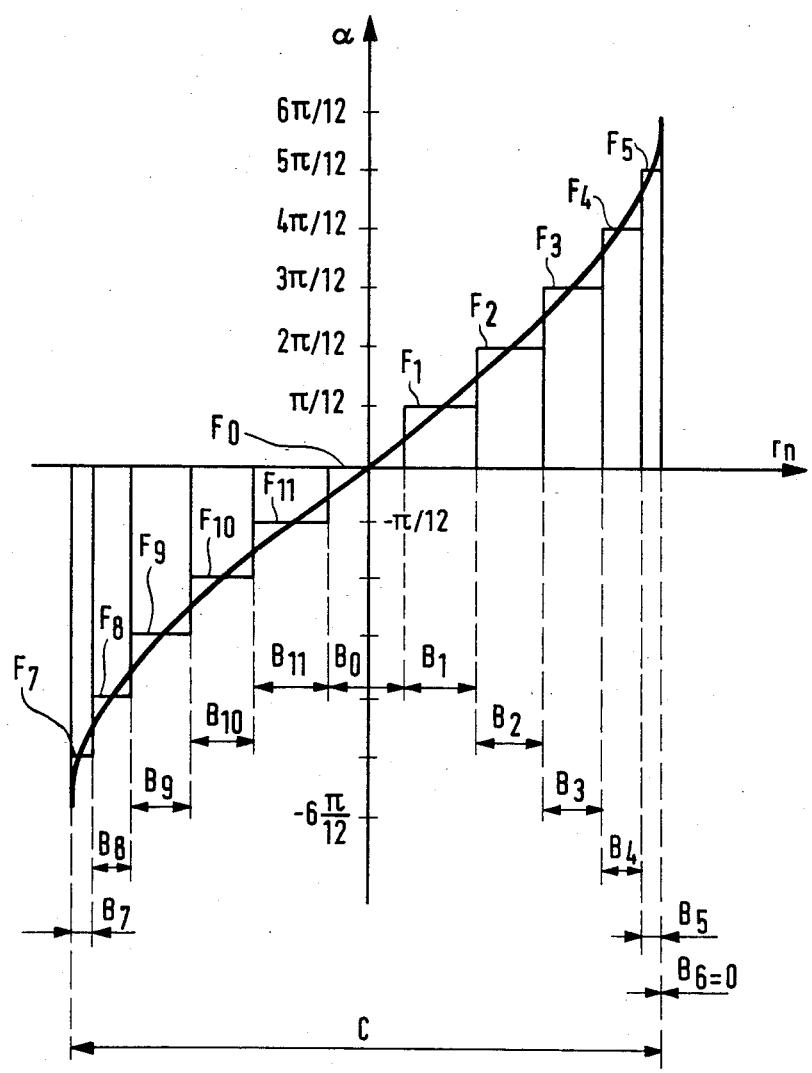
FIG. 7 is a function diagram used to clarify the operation of the embodiment of FIG. 1.

This function $\alpha = f(r_n)$ is represented for $N=12$ in FIG. 7.

In a second preferred embodiment of the invention it is further proposed to provide, instead of a scanning field G with N partial fields $F_n$ which present different widths $B_n$ and a constant mutual displacement $\Delta\alpha = \pi/N$, a scanning field G' with M partial fields $F'_m$ with constant width B' which present with respect to one another, however, a variable displacement which is dimensioned in such a way that the midlines of the partial fields $F_m'$ lie on the line formed by the function $\alpha = \arcsin(2r_m/C)$ for $N \to \infty$ (m=0,1,2, . . ., (M−1); $M \geq N$; M = odd number).

For the distance $r_m$ of the middle of the m-th partial field $F_m$ with the constant width $B' = k \cdot P$ (k=whole number) from the middle of the scanning field G' there holds, accordingly:

$$r_m = kmP + P\alpha/2\pi$$

$$r_m = P[km + (\tfrac{1}{2}\pi)\arcsin(2r_m/C)]$$

With $C \sim kP(M-1)$ and $\arcsin(2r_m/C) \sim \arcsin(2Pkm/C)$ there is yielded:

$$r_m = P[km + (\tfrac{1}{2}\pi)\arcsin(2Pkm/kp(M-1))]$$

$$r_m = P[km + (\tfrac{1}{2}\pi)\arcsin(2m/(M-1))]$$

Figure 4:
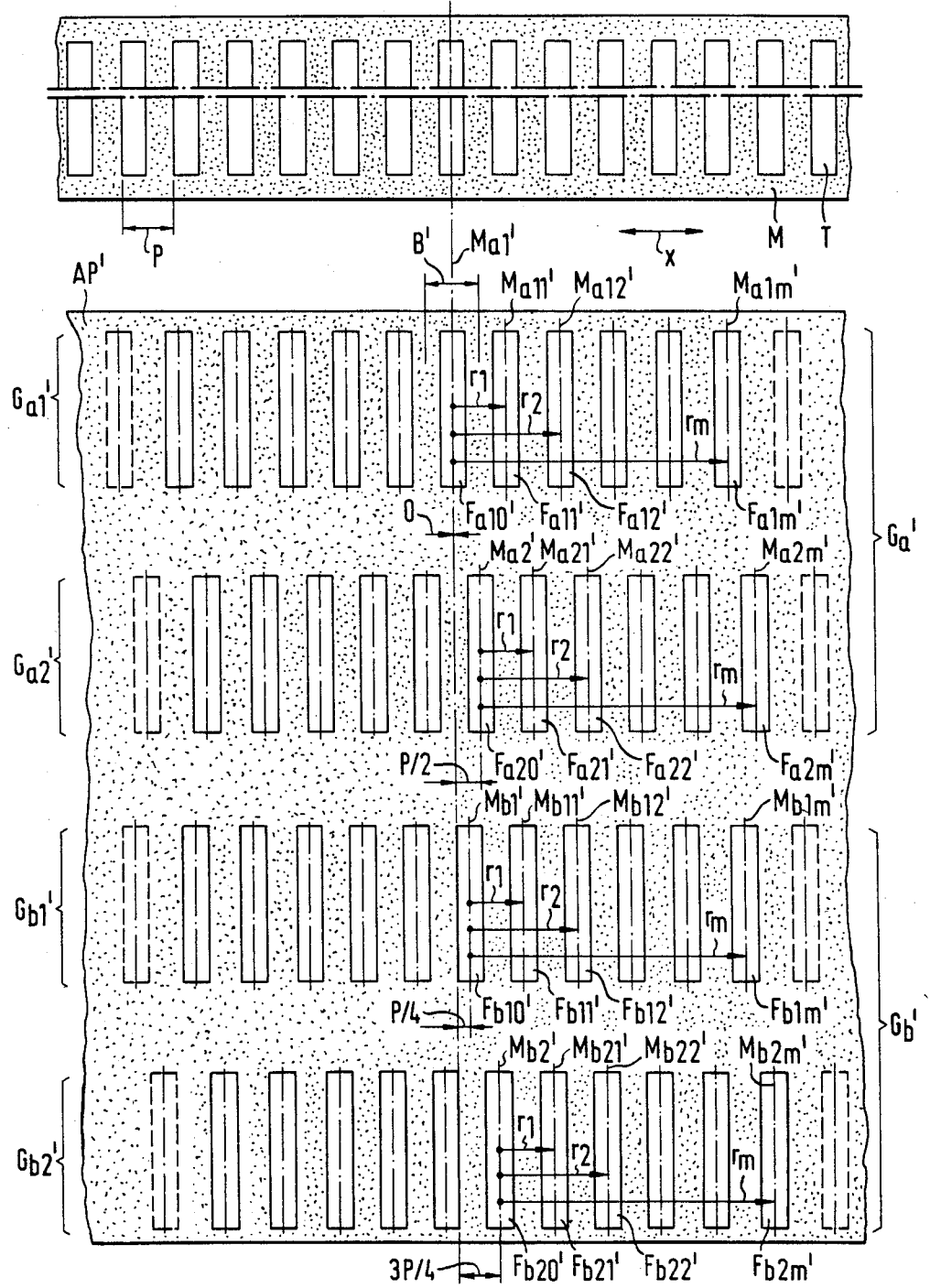
FIG. 4 is a plan view of a measuring graduation and a scanning plate of a second preferred embodiment of this invention.

FIG. 4 shows an enlarged view of the scale M according to FIG. 2, the graduation T of which with the graduation period P is scanned by means of a scanning plate AP'. The periodic analog signal $S(x)$ recovered from the graduation T has, let us assume, the bandwidth N. According to this embodiment of the invention, therefore, for the recovery of a first harmonic-free periodic analog signal in the form of the first Fourier coefficient $a_1$ of the fundamental wave of the periodic analog signal $S(x)$, a first scanning group $G_a'$ is provided on the scanning plate AP' with a first scanning field $G_{a1}'$ and a second scanning field $G_{a2}'$. For the recovery of a second harmonic-free periodic signal in the form of the second Fourier coefficient $b_1$ of the fundamental wave of the periodic analog signal $S(x)$ a second scanning group $G_b'$ is provided on the scanning plate AP' with a first scanning field $G_{b1}'$ and a second scanning field $G_{b2}'$.

Each scanning field $G_{a1}'$, $G_{a2}'$, $G_{b1}'$, $G_{b2}'$ of the two scanning groups $G_a'$, $G_b'$ consists of M partail fields $F_{a1m}'$, $F_{a2m}'$, $F_{b1m}'$, $F_{b2m}'$, [m=0,1,2, . . ., (M−1); $M \geq N$]. The partial fields $F_{a1m}'$, $F_{a2m}'$, $F_{b1m}'$, $F_{b2m}'$ present in each case a graduation identical with the graduation T of the scale M and in measuring direction x a constant width $B' = kP$ (k = whole number). According to FIG. 4 the width B' of the partial fields $F_{a1m}'$, $F_{a2m}'$, $F_{b1m}'$, $F_{b2m}'$ is equal to the graduation period P of the graduation T of the scale M (k=1).

The partial field midlines $M_{a1m}'$, $M_{a2m}'$, $M_{b1m}'$, $M_{b2m}'$ of the partial fields $F_{a1m}'$, $F_{a2m}'$, $F_{b1m}'$, $F_{b2m}'$ are offset with respect to the scanning field midline $M_{a1}'$, $M_{a2}'$, $M_{b1}'$, $M_{b2}'$ of the appertaining scanning fields $G_{a1}'$, $G_{a2}'$, $G_{b1}'$, $G_{b2}'$ in the measuring direction by the distances $r_m = P[k \cdot m + (\tfrac{1}{2}\pi)\arcsin(2m/-(M-1))]$. The scanning field midlines $M_{a1}'$, $M_{b1}'$ of the first scanning fields $G_{a1}'$, $G_{b1}'$ are offset against the scanning field midlines $M_{a2}'$, $M_{b2}'$ of the second scanning fields $G_{a2}'$, $G_{b2}'$ by half the graduation period P of the graduation T of the scale M in the measuring direction; the first scanning group $G_a'$ is offset with respect to the second scanning group $G_b'$ by a quarter of the graduation P of the graduation T of the scale M in the measuring direction.

Figure 6A:
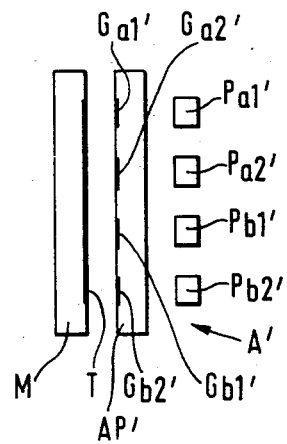
FIGS. 6a and 6b are schematic representations of an alternative scanning unit with an evaluating arrangement for use with the embodiment of FIG. 4.
Figure 6B:
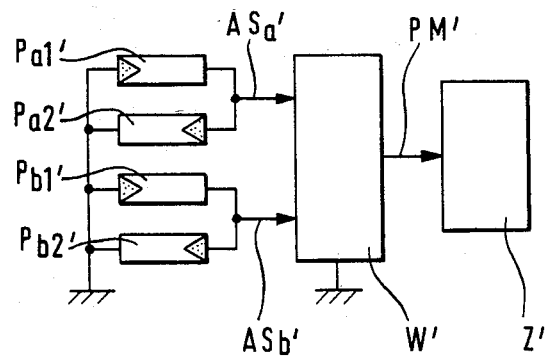

To the first scanning field $G_{a1}'$ of the first scanning group $G_a'$ there is allocated according to FIG. 6a a first photo-element $P_{a1}'$ and to the second scanning field $G_{a2}'$ there is allocated a second photo-element $P_{a2}'$, which is switched antiparallel (in difference) with the photo-element $P_{a1}$. The harmonic-free output signal $AS_a'$ of the two antiparallel switched photo-elements $P_{a1}'$, $P_{a2}'$ is proportional to the first Fourier coefficient $a_1$ of the fundamental wave of the periodic analog signal $S(x)$ and is fed according to FIG. 6b to an evaluating arrangement W' for the formation of position measuring values PM', which can be displayed in a display unit Z' engaged on the outlet side.

To the first scanning field $G_{b1}'$ of the second scanning group $B_b'$ there is allocated according to FIG. 6a a first photo-element $P_{b1}'$ and to the second scanning field $G_{b2}'$ there is allocated a second photo-element $P_{b2}'$, which is connected antiparallel (in difference) with the photo-element $P_{b1}'$. The harmonic free output signal $AS_b'$ of the two antiparallel connected photo-elements $P_{b1}'$, $P_{b2}'$ is proportional to the second Fourier coefficient $b_1$ of the fundamental wave of the periodic analog signal S(x) and is fed according to FIG. 6b likewise to the evaluating arrangement W' for the formation of position measuring values PM', which can be displayed in the display unit Z' engaged on the outlet side.

The evaluating arrangements W, W' can include for the formation of position measuring values PM, PM' a direction discriminator for the detection of the measuring direction, which is connected to an up-down counter. Likewise the evaluating arrangements W, W' may include an additional interpolation arrangement for the formation of interpolated position measuring values within the graduation period P of the graduation T of the scale M.

In the event of any inconsistencies between the foregoing description of the preferred embodiments and previously filed West German patent application No. P 34 12 128.5, the West German patent application is intended to control. West German patent application No. P 34 12 128.5 is hereby incorporated by reference for this purpose.

Of course, it should be understood that a wide variety of changes and modifications can be made to the preferred embodiments described above. For example, the invention is not restricted to photoelectric position measuring systems, but is also successfully usable in magnetic, inductive and capacitive position measuring arrangements. It is therefore intended that the foregoing detailed description be regarded as illustrative rather than limiting, and that it be understood that it is the following claims, including all quivalents, which are intended to define the scope of this invention.

I Claim:

1. In a position measuring system for measuring the relative position of two objects, of the type comprising a graduation carrier which defines a graduation extending along a measuring direction and a scanning unit which scans the graduation and generates at least one periodic analog signal having a bandwidth N, the improvement comprising:
    at least two first scanning fields included in the scanning unit, offset with respect to one another along the measuring direction, each first scanning field comprising N first partial fields, adjacent first partial fields displaced with respect to one another by a constant dimension in the measuring direction, each of the first partial fields defining a respective width along the measuring direction, said widths of the first partial fields varying according to a selected sine function; and
    means for developing a plurality of first periodic signals, each from a respective one of the first partial fields, and for superposing the first periodic signals to generate at least one composite periodic signal, said selected sine function chosen such that the composite signal is harmonic-free.

2. The invention of claim 1 wherein the first scanning fields are included in a first scanning group, and wherein the invention further comprises:
    (a) a second scanning group or generating a second harmonic-free periodic analog signal, said second scanning group comprising two second scanning fields; wherein
    (b) said first scanning fields are offset in the measuring direction by P/2 with respect to one another and the second scanning fields are offset in the measuring direction by P/2 with respect to one another, where P is equal to a grid constant defined by the graduation;
    (c) said first scanning group is offset in the measuring direction by P/4 with respect to the second scanning group;
    (d) each of said second scanning fields comprises N second partial fields;
    (e) adjacent second partial fields are displaced with respect to one another by a constant dimension in the measuring direction, and the constant dimension is equal to P/2N;
    (f) the widths in the measuring direction of the first partial fields of the first scanning group are proportional to a factor $|\cos(n\pi/N)|$, where $n=1, 2, \ldots N$, and the widths in the measuring direction of the second partial fields of the second scanning group are proportional to a factor $|\sin(n\pi/N)|$, where $n=1, 2, \ldots N$;
    (g) a respective scanning element is associated with each of the scanning fields; and
    (h) the scanning elements associated with the first scanning fields are circuited in difference to generate a first difference signal, the scanning elements associated with the second scanning fields are circuited in difference to generate a second difference signal, and the difference signals are applied to an evaluating means for generating a position measuring value.

3. The invention of claim 2 wherein each of the scanning elements comprises a respective photosensitive element.

4. The invention of claim 2 wherein the evaluating means comprises a direction discriminator and an up-down counter coupled to the direction discriminator.

5. The invention of claim 4 wherein the evaluating means further comprises means for generating interpolated position measuring values within a graduation period P of the graduation of the graduation carrier.

6. In a position measuring system for measuring the relative position of two objects, of the type comprising a graduation carrier which defines a graduation extending along a measuring direction and a scanning unit which scans the graduation and generates at least one periodic analog signal having a bandwidth N, the improvement comprising:
    at least two first scanning fields included in the scanning unit, each defining a respective first scanning field midline, said first scanning field midlines being offset with respect to one another along the measuring direction, each first scanning field comprising M first partial fields, where $M \geq N$, each first partial field defining a respective first partial field midline, said first partial fields positioned such that the separation in the measuring direction between the first partial field midlines and the respective first scanning field midline varies according to a selected arc-sine function, each of said first partial fields defining a constant width; and means for developing a plurality of first periodic signals, each from a respective one of the first partial fields, and for superposing the first periodic signals to generate at least one composite periodic signal, said selected arc-sine function chosen such that the composite signal is harmonic-free.

7. The invention of claim 6 wherein the first scanning fields are included in a first scanning group, and wherein the invention further comprises:

(a) a second scanning group for generating a second harmonic-free periodic analog signal, said second scanning group comprising two second scanning fields, each defining a respective second scanning field midline; wherein (b) said first scanning field midlines are offset in the measuring direction by P/2 with respect to one another and said second scanning field midlines are offset in the measuring direction by P/2 with respect to one another, where P is equal to a grid constant defined by the graduation; p1 (c) said first scanning group is offset in the measuring direction by P/4 with respect to the second scanning group;

(d) each of said second scanning fields comprises M second partial fields numbered from $m=0$ to $m=M-1$, where $M \geq N$, each of which defines a respective partial field midline;

(e) the first and second partial field midlines are spaced from the respective first and second scanning field midlines in the measuring direction by $r_m = P[k \cdot m + (\frac{1}{2}\pi) \text{ arc sin } (2m/(M-1))]$, where k equals a whole number;

(f) each of the first and second partial fields define a constant width in the measuring direction equal to $K \cdot P$;

(g) a respective scanning element is associated with each of the scanning fields; and (h) the scanning elements associated with the first scanning fields are circuited in difference to generate a first difference signal, the scanning elements associated with the second scanning fields are circuited in difference to generate a second difference signal, and the difference signals are applied to an evaluating means for generating a position measuring value.

8. The invention of claim 7 where in $K=1$ and the constant width equals P.

9. The invention of claim 7 wherein each of the scanning elements comprises a respective photosensitive element.

10. The invention of claim 7 wherein the evaluating means comprises a direction discriminator and an up-down counter coupled to the direction discriminator.

11. The invention of claim 10 wherein the evaluating means further comprises means for generating interpolated position measuring values within a graduation period P of the graduation of the graduation carrier.

12. The invention of claim 6 wherein the constant width equals P.

* * * * *

UNITED STATES PATENT AND TRADEMARK OFFICE
CERTIFICATE OF CORRECTION

PATENT NO. : 4,602,436
DATED : July 29, 1986
INVENTOR(S) : Alfons Ernst

It is certified that error appears in the above-identified patent and that said Letters Patent is hereby corrected as shown below:

IN THE ABSTRACT

In line 20 of the Abstract please delete "difference of those" and substitute therefor --difference to those--.

IN THE DETAILED DESCRIPTION OF
THE PRESENTLY PREFERRED EMBODIMENTS

In column 4, line 4, please delete "graduations" and substitute therefor --graduation--;

In column 4, line 6, please delete "evaulated" and substitute therefor --evaluated--;

In column 5, line 9, please delete the equation "$a_1 x = (1/N) a_1(x)$" and substitute therefor --$a_1 x = (1/N) \bar{a}_1(x)$--;

In column 5, line 11, please delete the equation "$b_1 x = (1/N) b_1(x)$" and substitute therefor --$b_1 x = (1/N) \bar{b}_1(x)$--;

In column 5, line 46, please delete the semi-colon (;) after "$F_{a2n}$" and end the sentence with a period (.);

In column 6, line 4, please delete "$Pa_{a2}$," and substitute therefor --$P_{a2}$,--;

UNITED STATES PATENT AND TRADEMARK OFFICE
CERTIFICATE OF CORRECTION

PATENT NO. : 4,602,436
DATED : July 29, 1986
INVENTOR(S) : Alfons Ernst

It is certified that error appears in the above-identified patent and that said Letters Patent is hereby corrected as shown below:

In column 6, lines 62-63, please delete "$F_{a2-3}$" and substitute therefor --$F_{a23}$--;

In column 7, line 3, please delete "widths of" and substitute therefor --widths--;

In column 8, line 1, please delete the comma (,) after "$F_{a23}$,";

In column 8, line 37 (the third line within the table), please delete "3πn/4" and substitute therefor --3π/4--;

In column 10, line 13, in the equation, please delete "/kp" and substitute therefor --/kP--;

In column 10, line 36, please delete "partail" and substitute therefor --partial--;

In column 10, line 47, please delete the lower case letter "el" from "$M_{al}$'," and substitute a numeral one therefor;

In column 10, line 61, please delete the lower case letter "el" from "$P_{al}$'" and substitute a numeral one therefor;

In column 11, line 5, please delete "$B_b$'" and substitute therefor --$G_b$'--;

UNITED STATES PATENT AND TRADEMARK OFFICE
CERTIFICATE OF CORRECTION

PATENT NO. : 4,602,436

DATED : July 29, 1986

INVENTOR(S) : Alfons Ernst

Page 3 of 3

It is certified that error appears in the above-identified patent and that said Letters Patent is hereby corrected as shown below:

In column 11, line 43, please delete "quivalents" and substitute therefor --equivalents--;

In Claim 7, subparagraph (b) (column 13, line 22), please delete "graduation;pl(c)" and substitute therefor --graduation; (c)--;

In Claim 7, subparagraph (f) (column 14, line 5), please delete "K•P" and substitute therefor --k•P--;

In Claim 8 (column 14, line 16) please delete "where in K=1" and substitute therefor --wherein k=1--.

Signed and Sealed this

Second Day of August, 1988

Attest:

DONALD J. QUIGG

*Attesting Officer*  *Commissioner of Patents and Trademarks*